(12) United States Patent
Strohband et al.

(10) Patent No.: US 7,650,202 B2
(45) Date of Patent: Jan. 19, 2010

(54) METHOD FOR PRODUCING A MOTOR VEHICLE

(75) Inventors: Sven Strohband, Mountain View, CA (US); Manojkumar Debnath, Sunnyvale, CA (US); Thomas Chan, Mountain View, CA (US)

(73) Assignee: Volkswagen AG, Wolfsburg (DE)

( * ) Notice: Subject to any disclaimer, the term of this patent is extended or adjusted under 35 U.S.C. 154(b) by 518 days.

(21) Appl. No.: 11/267,100

(22) Filed: Nov. 4, 2005

(65) Prior Publication Data

US 2007/0106414 A1    May 10, 2007

(51) Int. Cl.
*G06F 7/00* (2006.01)
(52) U.S. Cl. ...................................... 700/222
(58) Field of Classification Search .................. 700/95, 700/96, 115, 116, 117, 215, 221, 222, 226, 700/242, 244; 340/572.1, 572.7, 10.41, 10.1, 340/825.36
See application file for complete search history.

(56) References Cited

U.S. PATENT DOCUMENTS

| | | | | |
|---|---|---|---|---|
| 5,572,226 A | * | 11/1996 | Tuttle | 343/726 |
| 6,204,764 B1 | * | 3/2001 | Maloney | 340/568.1 |
| 6,714,121 B1 | * | 3/2004 | Moore | 340/10.3 |
| 7,069,100 B2 | * | 6/2006 | Monette et al. | 700/116 |
| 7,307,525 B2 | * | 12/2007 | Kiriyama | 340/572.1 |
| 7,441,320 B2 | * | 10/2008 | Hass et al. | 29/593 |
| 2007/0063029 A1 | * | 3/2007 | Brandt et al. | 235/385 |
| 2007/0109103 A1 | * | 5/2007 | Jedrey et al. | 340/10.5 |
| 2007/0216525 A1 | * | 9/2007 | Toshiaki et al. | 340/500 |

OTHER PUBLICATIONS

"Designed for Success"; GE Fanuc; 2004 pp. 1-3.*
Greengard, Samuel; "Driving Change in Auto Industry"; RFID Journal; Apr. 2004 pp. 38-44.*
"UCLA-WINMEC-2003-2002-RIFD-SmartParts"; UCLA-WINMEC; Oct. 2003; pp. 1-5.*
Cheldelin, Brent; "Mixed Model Assembly Quality: An Approach to Prevent Human Errors"; ASME; 2004 pp. 1-11.*

* cited by examiner

*Primary Examiner*—Ramesh B Patel
*Assistant Examiner*—Chad Rapp
(74) *Attorney, Agent, or Firm*—Laurence A. Greenberg; Werner H. Stemer; Ralph E. Locher (57) ABSTRACT

The invention relates to a method for manufacturing a motor vehicle or a motor vehicle part, wherein the motor vehicle or the motor vehicle part is assembled from components, wherein at least two components are each connected to at least one transponder in order to transmit an identification information item, wherein an identification information item transmitted by a transponder is received by means of a first antenna, wherein an identification information item transmitted by a transponder is received by means of a second antenna and wherein it is checked whether a component can be installed or is correctly installed, wherein the component is installed or is classified as correctly installed only if at least one identification information item received by means of the first antenna corresponds both to an identification information item received by means of the second antenna and to a predefined identification information item.

43 Claims, 8 Drawing Sheets

METHOD FOR PRODUCING A MOTOR VEHICLE

BACKGROUND OF THE INVENTION

1. Field of the Invention

The invention relates to a method for manufacturing a motor vehicle or a motor vehicle part, components being connected to transponders.

The identification of components is disclosed, for example, on the Internet.

DE 40 03 212 C2 discloses a device for identifying unit loads, comprising a planar data carrier which can be read from one side, is attached to the unit load and is composed of a magnetically permeable material which is provided with holes which are arranged distributed in the form of a matrix over its surface and whose particular distribution forms in each case a code which identifies the unit load, and a reading head which is arranged in the reading position at a short distance from the surface of the data carrier and which has at least one exciter for exciting a magnetic field which penetrates the data carrier, and a plurality of magnetic sensors which are arranged in the form of a matrix in a way which corresponds to the holes of the data carrier, and which respond to the presence of magnetically permeable material in the respectively opposite surface area of the data carrier.

DE 103 11 185 A1 discloses a label which can be interrogated by radio and which has a transponder for contactless transmission of data to a write/read device, having a flexible and, at the same time, tension-resistant carrier position on which the circuit elements of the transponder are arranged, and having an elastic, in particular compliant protective covering which encloses the carrier position and the circuit elements of the transponder.

EP 0 793 086 B1 discloses a method for checking motor vehicles, for example passenger cars, trucks or motorbikes, in a test area which is provided with test devices and in which a transponder is provided with vehicle-specific data, test-device-specific data and/or test-program-specific data, in which each vehicle is provided with the transponder containing the specific data, in which the transponder is arranged adjacent to test devices, in which the transponder is provided with test result data and in which test result data is transferred from the transponder to an evaluation device after the test has been terminated.

The object of the invention is to improve the manufacture of motor vehicles.

2. Summary of the Invention

The abovementioned object is achieved by means of a method for manufacturing a motor vehicle or a motor vehicle part, the method comprising the following steps:

assembly of the motor vehicle or of the motor vehicle part from components, wherein at least two components are each connected to at least one transponder in order to transmit an identification information item;

reception of an identification information item—transmitted by a transponder—by means of a first antenna;

reception of an identification information item—transmitted by a transponder—by means of a second antenna; and checking whether a component can be installed or is correctly installed, the component being installed or being classified as correctly installed only if at least one identification information item received by means of the first antenna corresponds both to an identification information item received by means of the second antenna and to a predefined identification information item.

The corresponding component can be installed here in particular before the checking, after the checking and/or during the checking.

In one refinement of the invention, the first antenna and/or the second antenna is/are aligned with the component and/or its installation location.

In a further refinement of the invention, a main direction of the second antenna is different from a main direction of the first antenna. In a further refinement of the invention, the first antenna and the second antenna are oriented with respect to one another in such a way that a main direction of the second antenna is at an angle of 30° to 330° with respect to a main direction of the first antenna. This angle occurs here in particular when the main directions are projected into a plane, in particular when they are projected onto the ground or a mounting surface.

In a further refinement of the invention, an energy signal is transmitted by means of the first antenna, in which case the transponder can be supplied with energy by means of the energy signal and/or can be excited to transmit the identification information item.

In a further refinement of the invention, an energy signal is transmitted by means of the second antenna, in which case the transponder can be supplied with energy by means of the energy signal and/or can be excited to transmit the identification information item.

In a further refinement of the invention, an energy signal is transmitted by means of a further antenna, in which case the transponder can be supplied with energy by means of the energy signal and/or can be excited to transmit the identification information item.

In a further refinement of the invention, checking whether a component can be installed or is correctly installed also takes place as a function of the frequency of identical identification information items received by means of the first antenna and/or by means of the second antenna.

In a further refinement of the invention, the component is installed or is classified as correctly installed only if the predefined identification information item corresponds to the identification information item received the most frequently by means of the first antenna and/or by means of the second antenna.

In a further refinement of the invention, the component is installed or is classified as correctly installed only if the predefined identification information item corresponds to an identification information item received at least a specific number of times by means of the first antenna and/or by means of the second antenna.

In a further refinement of the invention, the component is installed or is classified as correctly installed only if the predefined identification information item corresponds to an identification information item received at least a specific number of times per time unit by means of the first antenna and/or by means of the second antenna.

In a further refinement of the invention, at least a third antenna is provided for receiving an identification information item transmitted by a transponder, in which case the third antenna is oriented with a component store or stand, with a component, motor vehicle and/or motor vehicle part which is not to be checked and/or not with the component which is to be checked and/or its installation location. There is provision here for the component which is to be checked to be installed or classified as correctly installed only if the predefined identification information item does not correspond to an identification information item received by means of the third antenna.

In a further refinement of the invention, the motor vehicle or the motor vehicle part is moved to another location. After this, in a further refinement of the invention an identification information item transmitted by a transponder is received by means of the first antenna or a further antenna and it is checked whether the component is correctly installed, in which case the component is classified as correctly installed only if at least one identification information item received by means of the first antenna or by means of the further antenna at the other location corresponds to the predefined identification information item. In a further refinement of the invention, the other location is a final check station or an intermediate check station.

The abovementioned object is additionally achieved by means of a method for manufacturing a motor vehicle or a motor vehicle part, wherein the method comprises the following steps:

assembly of the motor vehicle or of the motor vehicle part from components, wherein at least two components are each connected to at least one transponder in order to transmit an identification information item;

reception of an identification information item—transmitted by a transponder—by means of a first antenna;

reception of an identification information item—transmitted by a transponder—by means of a second antenna; and checking whether a component can be installed or is correctly installed, the component being installed or being classified as correctly installed only if an identification information item received by means of the first antenna corresponds to a predefined identification information item but not to an identification information item received by means of the second antenna.

The corresponding component can be installed here in particular before the checking, after the checking and/or during the checking.

In one refinement of the invention, the first antenna is aligned with the component and/or its installation location, in which case in particular there is provision for the second antenna not to be aligned with the component and/or its installation location.

In a further refinement of the invention, the second antenna is aligned with a component store or stand.

In a further refinement of the invention, the second antenna is aligned with a component, motor vehicle and/or motor vehicle part which is not to be checked.

In a further refinement of the invention, a main direction of the second antenna is different from a main direction of the first antenna. In a further refinement of the invention, the first antenna and the second antenna are oriented with respect to one another in such a way that a main direction of the second antenna does not intersect a main direction of the first antenna. The two main directions not intersecting means, in particular, that the projections of the main directions into a plane, in particular the projections of the main directions onto the ground or a mounting surface, do not intersect.

In a further refinement of the invention, an energy signal is transmitted by means of the first antenna, in which case the transponder can be supplied with energy by means of the energy signal and/or can be excited to transmit the identification information item.

In a further refinement of the invention, an energy signal is transmitted by means of a further antenna, in which case the transponder can be supplied with energy by means of the energy signal and/or can be excited to transmit the identification information item.

In a further refinement of the invention, checking whether a component can be installed or is correctly installed also takes place as a function of the frequency of identical identification information items received by means of the first antenna.

In a further refinement of the invention, the component is installed or is classified as correctly installed only if the predefined identification information item corresponds to the identification information item received the most frequently by means of the first antenna.

In a further refinement of the invention, the component is installed or is classified as correctly installed only if the predefined identification information item corresponds to an identification information item received at least a specific number of times by means of the first antenna.

In a further refinement of the invention, the component is installed or is classified as correctly installed only if the predefined identification information item corresponds to an identification information item received at least a specific number of times per time unit by means of the first antenna.

In a further refinement of the invention, the motor vehicle or the motor vehicle part is moved to another location. Then, in a further refinement of the invention an identification information item transmitted by a transponder is received by means of the first antenna or a further antenna and it is checked whether the component is correctly installed, in which case the component is classified as correctly installed only if at least one identification information item received by means of the first antenna or by means of the further antenna at the other location corresponds to the predefined identification information item. In a further refinement of the invention, the other location is a final check station or an intermediate check station.

The abovementioned object is achieved by means of a method for manufacturing a motor vehicle or a motor vehicle part, the method comprising the following steps:

assembly of the motor vehicle or of the motor vehicle part from components, wherein at least two components are each connected to at least one transponder in order to transmit an identification information item;

transmission of an energy signal by means of a first antenna, wherein a transponder can be supplied with energy by means of the energy signal and/or can be excited to transmit an identification information item;

reception of an identification information item—transmitted by a transponder—by means of a second antenna; and checking whether a component can be installed or is correctly installed, wherein the component is installed or is classified as correctly installed only if an identification information item received by means of the second antenna corresponds to a predefined identification information item.

The corresponding component can in particular be installed here before the checking, after the checking and/or during the checking.

In a further refinement of the invention, the first antenna and the second antenna are oriented with respect to one another in such a way that a main direction of the second antenna is at an angle of 30° to 330° with respect to a main direction of the first antenna. This angle is obtained here in particular when the main directions are projected into a plane, in particular when there is a projection onto the ground or onto a mounting surface.

The abovementioned object is achieved by means of a method for manufacturing a motor vehicle or a motor vehicle part, the method comprising the following steps:

assembly of the motor vehicle or of the motor vehicle part from components, wherein at least two components are each connected to at least one transponder in order to transmit an identification information item;

reception of an identification information item—transmitted by a transponder—by means of an antenna;

determination of the frequency of identical identification information items received by means of the antenna; and checking whether a component can be installed or is correctly installed, as a function of the frequency of identical identification information items received by means of the antenna.

The corresponding component here can in particular be installed before the checking, after the checking and/or during the checking.

In one refinement of the invention, the component is installed or is classified as correctly installed only if a predefined identification information item corresponds to the identification information item received most frequently by means of the antenna.

In a further refinement of the invention, the component is installed or is classified as correctly installed only if a predefined identification information item corresponds to an identification information item received at least a specific number of times by means of the antenna.

In a further refinement of the invention, the component is installed or is classified as correctly installed only if a predefined identification information item corresponds to an identification information item received at least a specific number of times per time unit by means of the antenna.

The abovementioned object is achieved by means of a method for manufacturing a motor vehicle or a motor vehicle part, the method comprising the following steps:

assembly of the motor vehicle or of the motor vehicle part from components, wherein at least two components are each connected to at least one transponder in order to transmit an identification information item;

reception of an identification information item—transmitted by a transponder—by means of an antenna at a first location;

movement of the motor vehicle or of the motor vehicle part from the first location to a second location;

reception of an identification information item—transmitted by a transponder—by means of the antenna or a further antenna at the second location; and checking whether a component is correctly installed, wherein the component is classified as correctly installed only if an identification information item received at the first location corresponds both to an identification information item received at the second location and to a predefined identification information item.

In one refinement of the invention, the first location is an assembly line or part of the assembly line. In a further refinement of the invention the second location is a final check station or an intermediate check station.

The main direction in the sense of the inventions is in particular a main beam direction or main reception direction.

Identification information item in the sense of the inventions are, in particular, information items which individually characterize a component or its type. The method according to the invention can be used in a particularly suitable way if at least six components are each connected to at least one transponder in order to transmit an identification information item.

Transponders in the sense of the inventions are, in particular, transmitters which are suitable for transmitting an identification information item. Transponders in the sense of the inventions are, in particular, elements which do not have any appreciable energy store of their own and receive their transmission energy from another transmitter in a wire-free fashion. Suitable transponders may be obtained, for example, from Alien, Harting or Siemens. Suitable transponders are published on the Internet.

Checking whether a component is correctly installed is intended to include, within the sense of the inventions, in particular checking whether the correct component is installed and/or whether the corresponding component is installed at all and is not missing.

A motor vehicle in the sense of the inventions is in particular a land vehicle which can be used individually in r0Ad traffic. Motor vehicles in the sense of the invention are in particular not restricted to land vehicles with an internal combustion engine.

Further advantages and details emerge from the following description of exemplary embodiments.

DETAILED DESCRIPTION OF PREFERRED EXEMPLARY EMBODIMENTS

Figure 1:
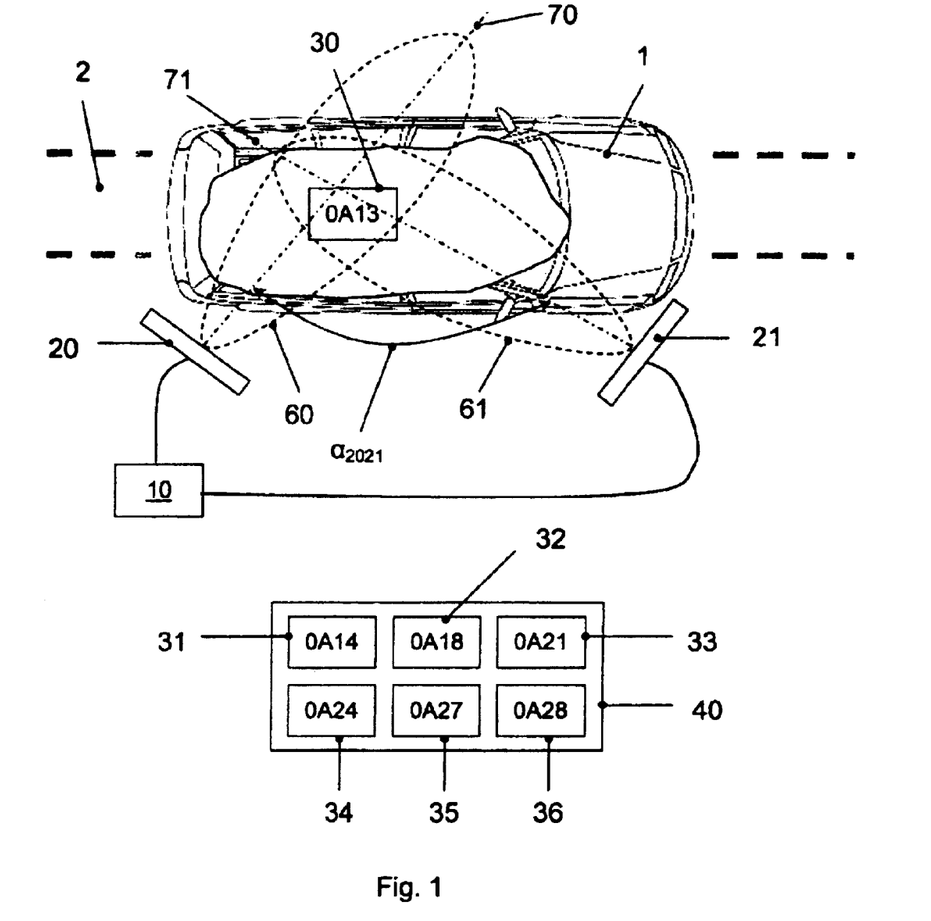
FIG. 1 shows an exemplary embodiment of an arrangement for checking whether a component can be installed or is correctly installed.

FIG. 1 shows a motor vehicle 1 in an assembly line 2. The motor vehicle 1 is composed of components 30, a number of which are connected to at least on transponder in order to transmit an identification information item (for example 0A13). A corresponding component 30 may be removed, for example, from a component store or stand 40 in which further components for the motor vehicle 1 and/or components 31, 32, 33, 34, 35, 36 for other motor vehicles are also stored. The transponder is a transmitter which does not have any appreciable energy store of its own and receives its transmission energy in a wire-free fashion from another transmitter. Suitable transponders may be obtained, for example, from Alien, Harting or Siemens. Suitable transponders are published on the Internet.

At least two antennas 20 and 21 are directed at the motor vehicle 1 or a test location or an installation location of the component 30. Reference symbol 60 designates a highly simplified radiation beam of the antenna 20. Reference symbol 61 designates a highly simplified radiation beam of the antenna 21. Reference symbols 70 and 71 designate the main directions of the antennas 20 and 21. As is apparent from FIG. 1, the main direction 70 of the antenna 20 is different from the main direction 71 of the antenna 21. The antennas 20 and 21 are oriented with respect to one another here is such a way that the main direction 70 of the antenna 20 is at an angle $\alpha_{2021}$ of 30° to 330° with respect to the main direction 71 of the antenna 21. This angle is obtained in particular when the main directions are projected into a plane, in particular when there is a projection onto the ground or a mounting surface.

Figure 2:
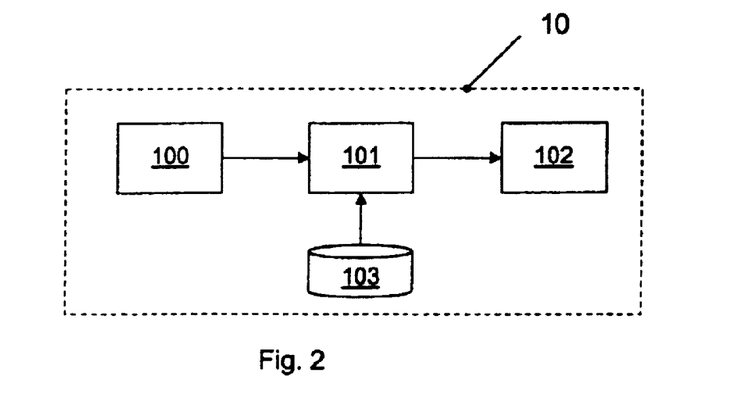
FIG. 2 shows an exemplary embodiment of a test device.

The antennas 20 and 21 are connected to a test device 10 which is illustrated in FIG. 2. The test device 10 comprises a receiver and decoder module 100 for evaluating signals received by means of the antennas 20 and 21 and for determining identification information items received with the signals. It is also possible to provide for an energy signal to be generated by means of the receiver and decoder module 100 and to be transmitted by means of the antenna 20, the antenna 21 or, if appropriate, a further antenna in order to supply the transponder of the component 30 with energy and/or to excite it to transmit an identification information item.

Figure 3:
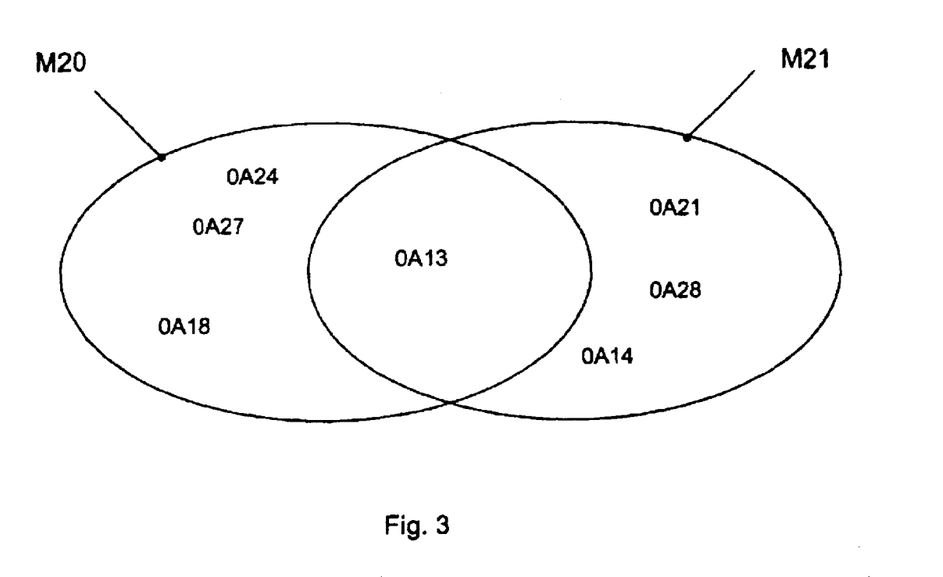
FIG. 3 shows an illustration of set.

The test device 10 also comprises a test module 101 for checking whether the component 30 can be installed or is correctly installed. In this context, the component 30 is installed or classified as correctly installed only if at least one identification information item received by means of the antenna 20 corresponds both to an identification information item received by means of the antenna 21 and to a predefined identification information item. That is to say, as illustrated in FIG. 3, it is checked whether the predefined identification information item, that is to say 0A13, is contained in the intersection of the set M20 of the identification information items, for example 0A24, 0A27, 0A18 and 0A13, received by means of the antenna 20, and the set M21 of the identification information items received by means of the antenna 21, for example 0A21, 0A28, 0A14 and 0A13. The installation of the component 30 may be carried out here, in particular, before the checking, after the checking and/or during the checking. The predefined identification information item may be stored, for example, in a memory 103 or be made available by some other, in particular superordinate computing device.

Figure 4:
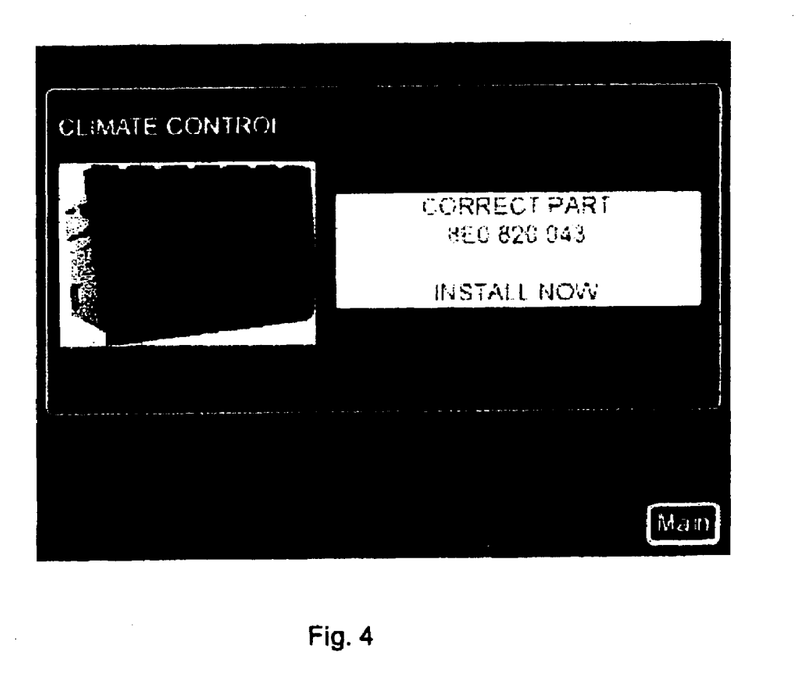
FIG. 4 shows a result of a checking process on a screen.

The result of the checking is reported to a fitter by means of a, for example, visual and/or audible, output module 102. This may be done, for example, by means of a mask which can be presented on a monitor, illustrated by way of example in FIG. 4. This mask which can be presented on a monitor, illustrated by way of example in FIG. 4, shows the fitter that the air conditioning system which is selected by the filter for installation and which has the number 8E0 820 043 is the component to be installed.

Figure 5:
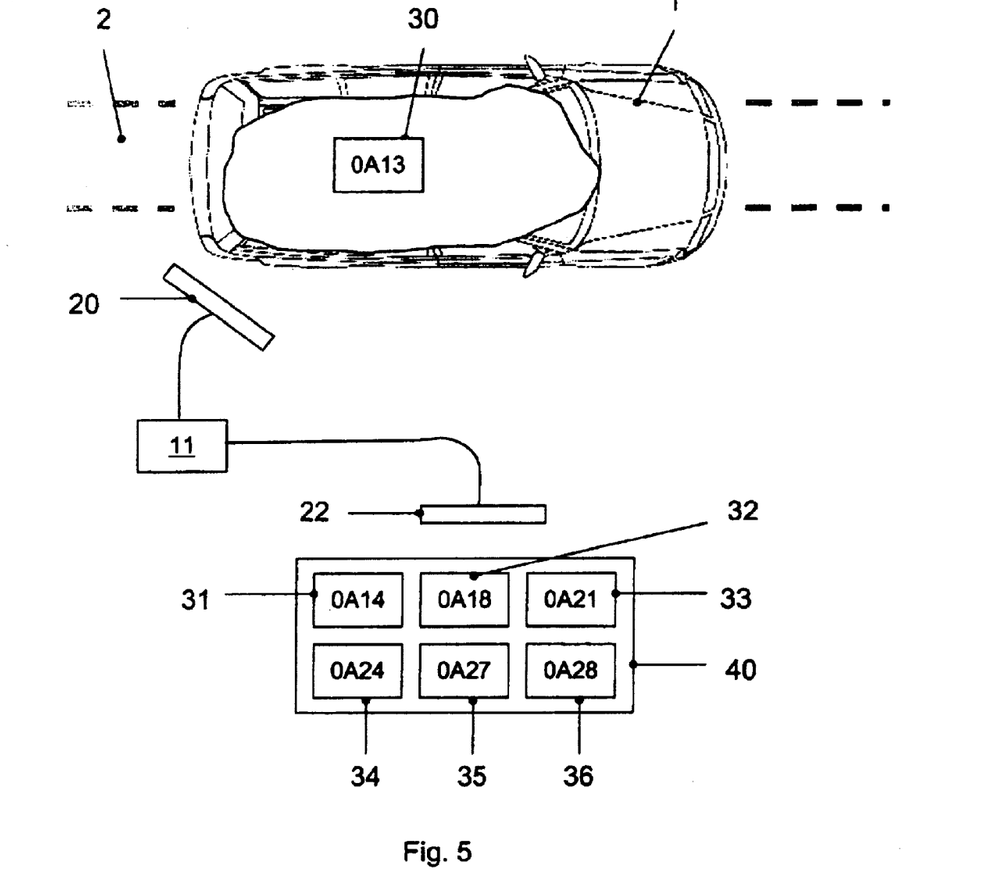
FIG. 5 shows a further exemplary embodiment of an arrangement for checking whether a component can be correctly installed or is correctly installed.

FIG. 5 shows an alternative exemplary embodiment of a motor vehicle in an assembly line, identical reference symbols to those in FIGS. 1 and 3 designating identical objects or objects of the same type. In the exemplary embodiment according to FIG. 5 an antenna 20 is directed at the motor vehicle 1 or a test location or an installation location of the component 30. A further antenna 22 is directed at the component store or stand 40 so that the main direction of the antenna 20 does not intersect the main direction of the antenna 22.

The antennas 20 and 22 are connected to a test device 11. The test device 11 comprises a receiver and decoder module which corresponds to the receiver and decoder module 100 and has the purpose of evaluating signals received by means of the antennas 20 and 22 and of determining identification information items received using the signals. It is also possible to provide for an energy signal to be generated by means of the receiver and decoder module and to be transmitted by means of the antenna 20, the antenna 22 or possibly a further antenna in order to supply the transponder of the component 30 and the transponders of further components 31, 32, 33, 34, 35, 36 with energy and/or to excite it or them to transmit an identification information item.

Figure 6:
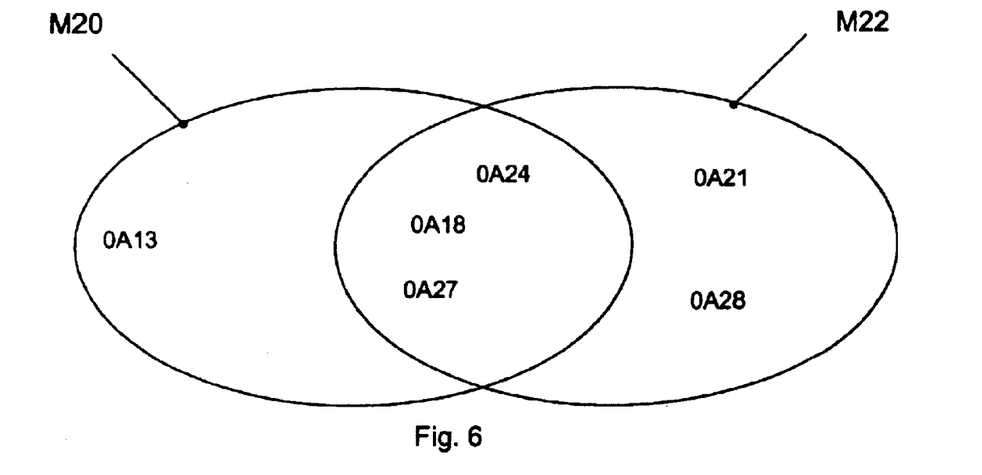
FIG. 6 shows a further illustration of set.

The test device 11 also comprises a test module for checking whether the component 30 can be installed or is correctly installed. In this context, the component 30 is installed or is classified as correctly installed only if an identification information item received by means of the antenna 20 corresponds to a predefined identification information item but not to an identification item received by means of the antenna 22. That is to say, as illustrated in FIG. 6, it is checked whether the predefined identification information item, that is to say for example 0A13, is indeed in the set M20 of the identification information items received by means of the antenna 20, for example 0A24, 0A27, 0A18 and 0A13, but not in the intersection of the set M20 of the identification information items received by means of the antenna 20, for example 0A24, 0A27, 0A18 and 0A13, and the set M21 of the identification information items, 0A24, 0A27, 0A18, 0A28 and 0A21, received by means of the antenna 22.

The predefined identification information item may be stored, for example, in a memory corresponding to the memory 103 or be made available by some other computing device, in particular a superordinate one. The test device 11 also comprises an output module which corresponds to the output module 102.

The method described with reference to FIG. 1, FIG. 2, FIG. 3 and FIG. 4 may be combined with the method described with reference to FIG. 5 and FIG. 6. Thus, for example in the case of the method described with reference to FIG. 1, FIG. 2, FIG. 3 and FIG. 4, it is possible to provide an antenna corresponding to the antenna 22, in which case the component 30 is classified as installed or as correctly installed only if an identification information item received by means of the antenna 20 corresponds to an identification information item received by means of the antenna 21 and to the predefined identification information item but not to an identification information item received by means of the antenna 22.

Figure 7:
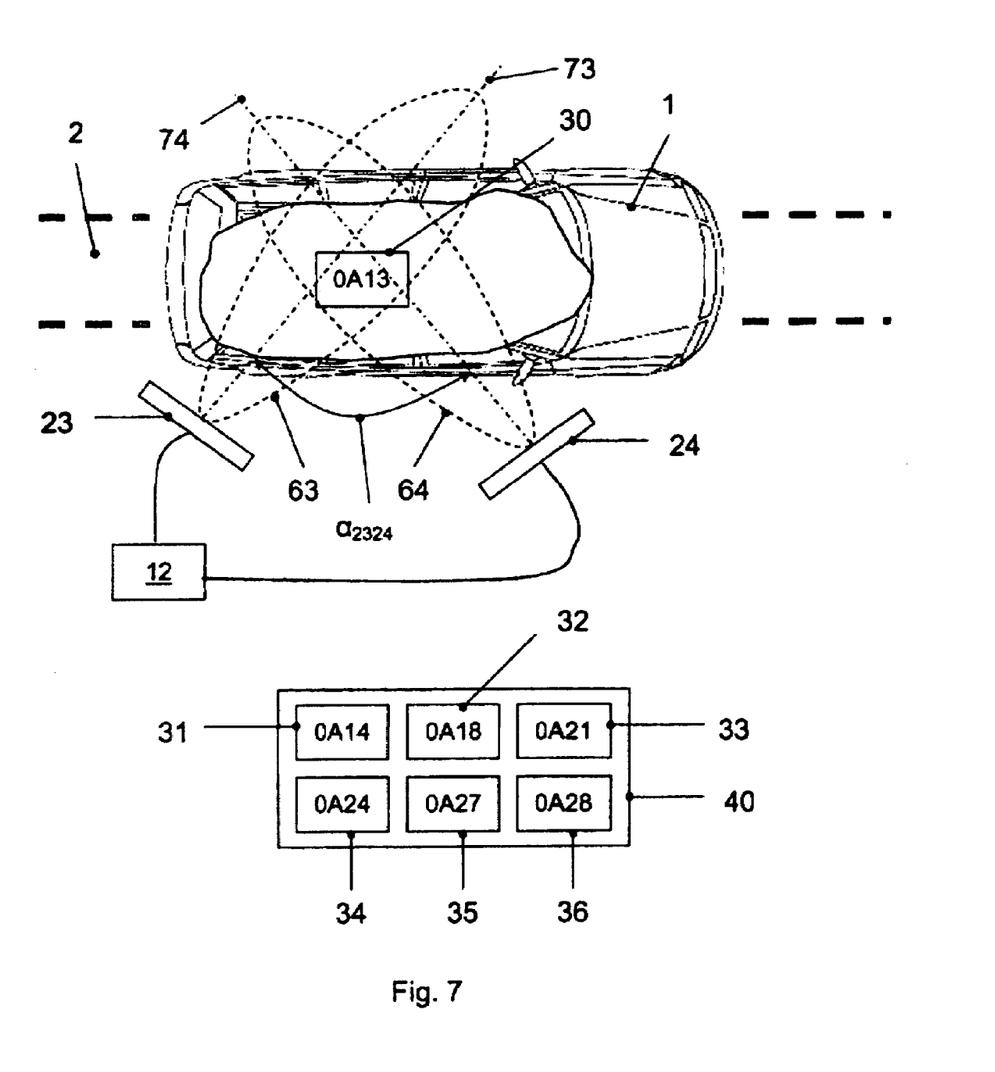
FIG. 7 shows a further exemplary embodiment of an arrangement for checking. whether a component can be installed or is correctly installed.

FIG. 7 shows a further exemplary embodiment of a motor vehicle 1 in an assembly line 2, identical reference symbols to those in FIGS. 1 and 2 designating objects which are identical or of the same type. In the exemplary embodiment according to FIG. 7, an antenna 23 for transmitting an energy signal and an antenna 24 for receiving an identification information item transmitted by a transponder are directed at the motor vehicle 1 or a test location or an installation location of a component 30. Reference symbols 63 and 64 designate radiation beams of the antennas 23 and 24 which are illustrated in a highly simplified form. The main directions of the antennas 23 and 24 are designated by reference symbols 73 and 74. As is apparent from FIG. 7, the main direction 73 of the antenna 23 is different from the main direction 74 of the antenna 24. The antennas 23 and 24 are oriented with respect to one another here in such a way that the main direction 73 of the antenna 23 is at an angle $\alpha_{2324}$ of 30° to 330° with respect to the main direction 74 of the antenna 24. This angle is obtained here in particular when the main directions are projected into a plane, in particular when there is a projection onto the ground or a mounting surface.

The antennas 23 and 24 are connected to a test device 12. The test device 12 comprises a receiver and decoder module which corresponds to the receiver and decoder module 100 and has the purpose of evaluating signals received by means of the antenna 24 and for determining identification information items received using the signals. In addition there is provision for an energy signal to be generated by means of the receiver and decoder module, said energy signal being transmitted by means of the antenna 23 in order to supply the transponder of the component 30 with energy and/or to excite it or them to transmit an identification information item.

The test device 12 also comprises a test module for checking whether the component 30 can be installed or is correctly installed. In this case, the component 30 is installed or is classified as correctly installed only if an identification information item received by means of the antenna 24 corresponds to a predefined identification information item. The predefined identification information item may, for example, be stored in a memory corresponding to the memory 103 or be made available by some other, in particular superordinate, computing device. The test device 11 also comprises an output module corresponding to the output module 102.

The method described with reference to FIG. 1, FIG. 2, FIG. 3 and FIG. 4 and with reference to FIG. 5 and FIG. 6 can be combined with the method described with reference to FIG. 7. Thus, for example an additional antenna for transmitting an energy signal may be provided both for the method described with reference to FIG. 1, FIG. 2, FIG. 3 and FIG. 4 and for the method described with reference to FIG. 5 and FIG. 6.

Figure 8:
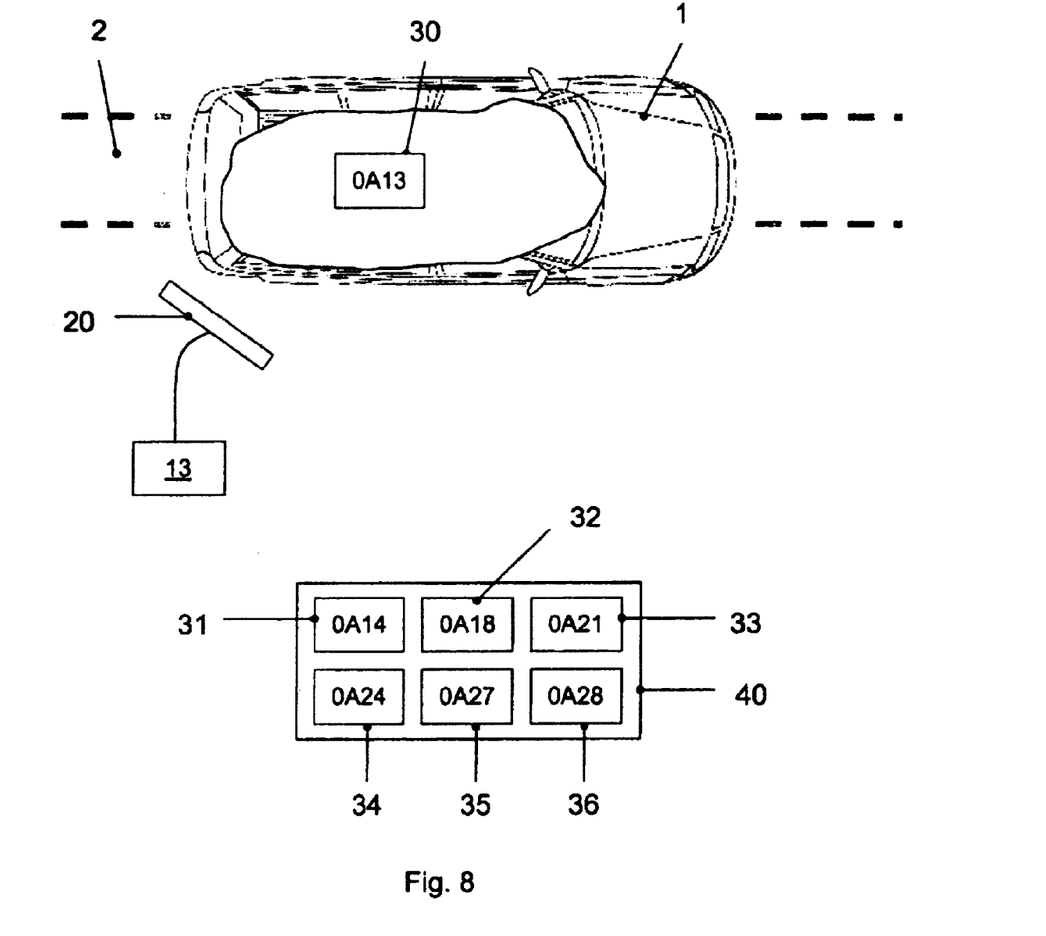
FIG. 8 shows a further exemplary embodiment of an arrangement for checking whether a component can be installed or is correctly installed.

FIG. 8 shows a further exemplary embodiment of a motor vehicle in an assembly line, identical reference symbols to those in FIGS. 1 and 2 designating objects which are identical or of the same type. In the exemplary embodiment according to FIG. 8, an antenna 20 for receiving an identification information item transmitted by a transponder is directed at the motor vehicle 1 or a test location or an installation location of the component 30.

The antenna 20 is connected to a test device 13. The test device 13 comprises a receiver and decoder module which corresponds to the receiver and decoder module 100 for the purpose of evaluating signals received by means of the antenna 20 and of determining identification information items received by the signals. In addition it is possible to provide that an energy signal is generated by means of the receiver and decoder module and that said energy signal is transmitted by means of the antenna 20 or, if appropriate, a further antenna (for example an antenna 23 illustrated in FIG. 7) in order to supply the transponder of the component 30 with energy and/or to excite it to transmit an identification information item.

The test device 13 also comprises a test module for checking whether the component 30 can be installed or is correctly installed. In this context, the component 30 is installed or is classified as correctly installed only

- if the predefined identification information item corresponds to the identification information item which is received or has been received most frequently by means of the antenna 20,
- if the predefined identification information item corresponds to an identification information item received or has been received at least a specific number of times by means of the antenna 20, or
- if the predefined identification information item corresponds to an identification information item received or has been received at least a specific number of times per time unit by means of the antenna 20.

Figure 9:
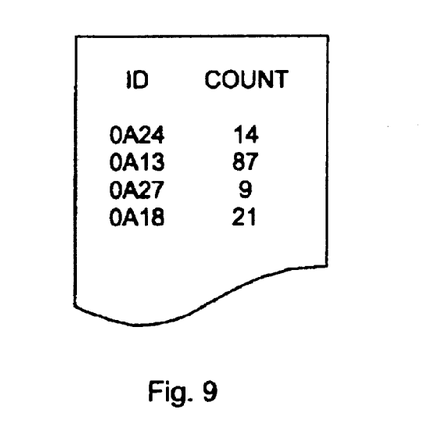
FIG. 9 shows an exemplary embodiment of a process of counting identification information item.

For example, if, as illustrated in FIG. 9, an identification information item "0A24" is received 14 times, an identification information item "0A13" is received 87 times, an identification information item "0A27" is received 9 times and an identification information item "0A18" is received 21 times in a specific time unit by means of the antenna 20 and if the predefined identification information item is "0A13", the component 30 is installed or is classified as correctly installed.

The methods described with respect to FIG. 1, FIG. 2, FIG. 3 and FIG. 4, the methods described with respect to FIG. 5 and FIG. 6 and the methods described with respect to FIG. 7 as well as their combinations may be combined with the method described with respect to FIG. 8 and FIG. 8.

Figure 10:
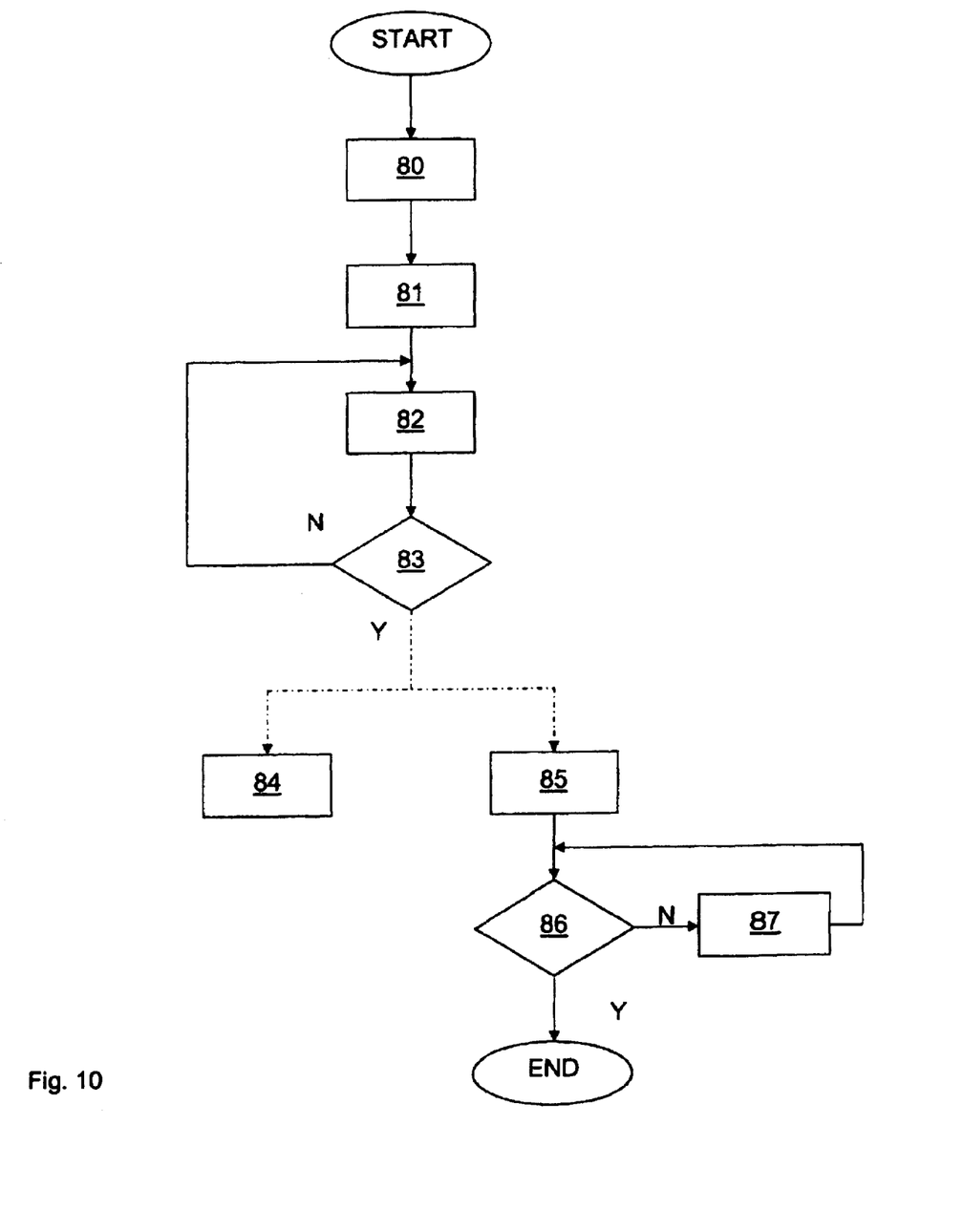
FIG. 10 shows a method for manufacturing a motor vehicle or motor part which can be composed of components.

FIG. 10 shows a method for manufacturing a motor vehicle or motor vehicle part which is composed of components. In this context, in a step 80, a corresponding component which is provided with a transponder is manufactured, and in a step 81 it is made available, for example, in an assembly line 2 or a component store or stand 40. The step 81 is followed by a step 82 in which a component is installed in the motor vehicle or the motor vehicle part. The step 82 is followed by an interrogation 83 or checking whether the installed component is the correct component. This takes place according to one of the methods described with reference to FIGS. 1 to 9 or a combination of these methods. The interrogation 83 can also take place before the step 82 or at the same time as the step 82. If the correct component is not installed, the step 82 is repeated with another component.

If the correct component is installed, the interrogation 83 can be followed by step 84 in which the step 82 and the interrogation 83 are repeated for a different component. It is possible to provide that the motor vehicle or the motor vehicle part is moved in advance. In the event of the correct component being installed, the interrogation 83 can be followed by a step 85 in which the motor vehicle or the motor vehicle part is moved to an intermediate check or a final check.

Figure 11:
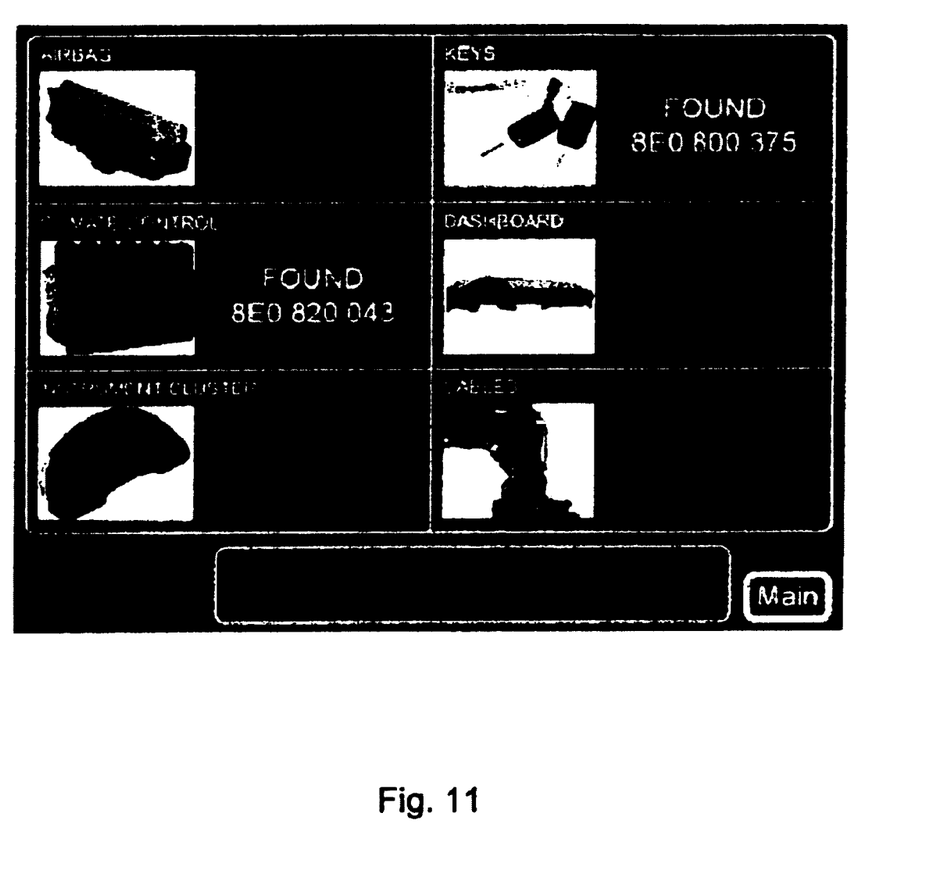
FIG. 11 shows a result of a checking process on a screen.

The step 85 is followed by an interrogation 86 or checking whether the installed components are the correct components and whether all the desired components are present. This takes place according to one of the methods described with reference to FIGS. 1 to 9 or a combination of these methods. The result of the checking can be displayed on a screen, for example, in a way displayed in FIG. 11. For example, in the example illustrated in FIG. 11 it is indicated that the keys with the identification information item "8E0 800 375" and the air conditioning system with the identification information item "8E0 820 043" are installed as desired. In contrast, the airbag with the identification information item "8E1 880 204", the dashb0Ard with the identification information item "8E1 857 003", the combination device with the identification information item "8E0 920 950" and the cable harness with the identification information item "WIR ESW IRE S" is missing. The absence of these components can be attributed to the fact that a corresponding component has not been installed or that an incorrect component has been installed.

If the installed components are not the correct components or if all the desired components are not present, the interrogation 86 is followed by a step 87 in which a repair or correction is carried out. The step 87 is followed again by the interrogation 86.

Figure 12:
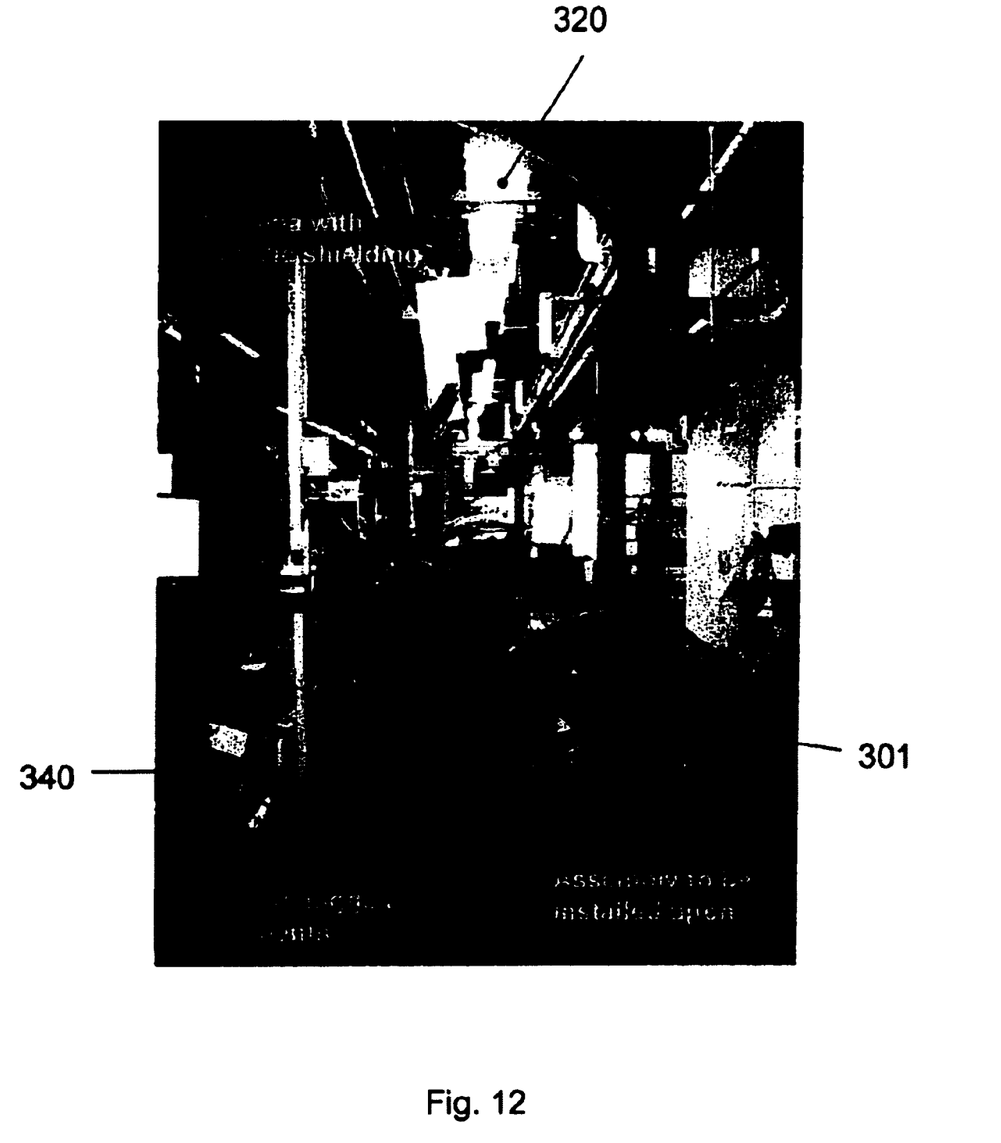
FIG. 12 shows an image of a motor vehicle part in an assembly line.

FIG. 12 shows an image of the motor vehicle part 301 corresponding to the motor vehicle 1, in an assembly line corresponding to the assembly line 2. Here, reference symbol 320 designates an antenna corresponding to one of the antennas 20, 21, 23 or 24, and reference symbol 340 designates a component store or stand corresponding to the component store or stand 40.

The objects, arrangements and dimensions in FIG. 1, FIG. 2, FIG. 5, FIG. 7 and FIG. 8 are not necessarily shown true to scale for the sake of simplicity and clarity. For example, the orders of magnitude of some objects, arrangements and dimensions are illustrated in an exaggerated form compared to other objects, arrangements and dimensions, in order to improve the understanding of the exemplary embodiments of the present invention.

| List of reference symbols | |
|---|---|
| 1 | Motor vehicle |
| 2 | Assembly line |
| 10, 11, 12, 13 | Test device |
| 20, 21, 22, 23, 24, 320 | Antenna |
| 30, 31, 32, 33, 34, 35, 36 | Component |
| 40, 340 | Component store or stand |
| 60, 61, 63, 64 | Highly simplified radiation beam |
| 70, 71, 73, 74 | Main direction |
| 80, 81, 82, 84, 85, 87 | Step |
| 83, 86 | Interrogation |
| 100 | Receiver and decoder module |
| 101 | Test module |
| 102 | Output module |
| 103 | Memory |
| 301 | Motor vehicle part |
| M20, M21, M22 | Set |
| $\alpha_{2021}, \alpha_{2324}$ | Angle |

We claim:

1. A method of manufacturing a motor vehicle or a motor vehicle part, the method which comprises:
   providing a plurality of components, wherein at least two components are each associated with a respective transponder configured to transmit an identification information item, and assembling the motor vehicle or the motor vehicle part from the components;
   receiving an identification information item, transmitted by a transponder, by way of a first antenna;
   receiving an identification information item, transmitted by a transponder, by way of a second antenna; and
   checking whether a respective component can be installed or is correctly installed; and
   performing one of the steps of the group of
      installing the component only if at least one identification information item received by way of the first antenna corresponds both to an identification information item received by way of the second antenna and to a predefined identification information item; and
      classifying the component as being correctly installed only if at least one identification information item received by way of the first antenna corresponds both to an identification information item received by way of the second antenna and to a predefined identification information item.

2. The method according to claim 1, wherein the first antenna is aligned with the component or an installation location thereof.

3. The method according to claim 2, wherein the second antenna is aligned with the component or an installation location thereof.

4. The method according to claim 3, wherein a main direction of the second antenna is different from a main direction of the first antenna.

5. The method according to claim 1, wherein a main direction of the second antenna is different from a main direction of the first antenna.

6. The method according to claim 1, which comprises orienting the first antenna and the second antenna with respect to one another such that a main direction of the second antenna encloses an angle of 30° to 330° with a main direction of the first antenna.

7. The method according to claim 1, which comprises transmitting an energy signal with the first antenna, wherein the transponder is supplied with energy by way of the energy signal or is excited to transmit the identification information item.

8. The method according to claim 1, which comprises transmitting an energy signal with the second antenna, wherein the transponder is supplied with energy by way of the energy signal or is excited to transmit the identification information item.

9. The method according to claim 1, which comprises transmitting an energy signal with a further antenna, wherein the transponder is supplied with energy by way of the energy signal or is excited to transmit the identification information item.

10. The method according to claim 1, wherein the step of checking whether a component can be installed or is correctly installed also takes into account a frequency of identical identification information items received by way of the first antenna or by way of the second antenna.

11. The method according to claim 1, which comprises installing the component or classifying the component as correctly installed only if the predefined identification information item corresponds to an identification information item received most frequently by way of the first antenna or by way of the second antenna.

12. The method according to claim 1, which comprises installing the component or classifying the component as correctly installed only if the predefined identification information item corresponds to an identification information item received at least a specific number of times by way of the first antenna or by way of the second antenna.

13. The method according to claim 1, which comprises installing the component or classifying the component as correctly installed only if the predefined identification information item corresponds to an identification information item received at least a specific number of times per unit of time by way of the first antenna or by way of the second antenna.

14. The method according to claim 1, which further comprises moving the motor vehicle or the motor vehicle part to another location.

15. The method according to claim 14, which further comprises:
   receiving an identification information item, transmitted by a transponder, with the first antenna or with a third antenna; and
   checking whether the component is correctly installed, and classifying the component as correctly installed only if at least one identification information item received with the first antenna or with the third antenna at a different location corresponds to the predefined identification information item.

16. The method according to claim 15, wherein the other location is a final check station or an intermediate check station.

17. A method for manufacturing a motor vehicle or a motor vehicle part, the method which comprises:
   providing a plurality of components, wherein at least two components are each associated with a respective transponder configured to transmit an identification information item, and assembling the motor vehicle or the motor vehicle part from the components;

receiving an identification information item, transmitted by a transponder, by way of a first antenna;

receiving an identification information item, transmitted by a transponder, by way of a second antenna; and checking whether a respective component can be installed or is correctly installed; and performing one of the steps of the group of installing the component only if the identification information item received by way of the first antenna corresponds to a predefined identification information item received but not to an identification information item received by way of second antenna; and classifying the component as being correctly installed only if the identification information item received by way of the first antenna corresponds to a predefined identification information item but not to an identification information item received by way of the second antenna.

18. The method according to claim 17, wherein the first antenna is aligned with the component or an installation location thereof.

19. The method according to claim 18, wherein the second antenna is not aligned with the component or an installation location thereof.

20. The method according to claim 17, wherein the second antenna is aligned with a stock room or a component rack.

21. The method according to claim 17, wherein the second antenna is aligned with a component, a motor vehicle, or a motor vehicle part that is not to be checked.

22. The method according to claim 21, wherein the second antenna is aligned with a stock room or a component rack.

23. The method according to claim 17, wherein a main direction of the second antenna is different from a main direction of the first antenna.

24. The method according to claim 17, wherein the first antenna and the second antenna are oriented with respect to one another such that a main direction of the second antenna does not intersect a main direction of the first antenna.

25. The method according to claim 17, which comprises transmitting an energy signal with the first antenna, wherein the transponder is supplied with energy by way of the energy signal or is excited to transmit the identification information item.

26. The method according to claim 17, which comprises transmitting an energy signal with a further antenna, wherein the transponder is supplied with energy by way of the energy signal or is excited to transmit the identification information item.

27. The method according to claim 17, wherein the step of checking whether a component can be installed or is correctly installed also takes into account a frequency of identical identification information items received by way of the first antenna.

28. The method according to claim 17, which comprises installing the component or classifying the component as correctly installed only if the predefined identification information item corresponds to an identification information item received most frequently by way of the first antenna.

29. The method according to claim 17, which comprises installing the component or classifying the component as correctly installed only if the predefined identification information item corresponds to an identification information item received at least a specific number of times by way of the first antenna.

30. The method according to claim 17, which comprises installing the component or classifying the component as correctly installed only if the predefined identification information item corresponds to an identification information item received at least a specific number of times per unit of time by way of the first antenna.

31. The method according to claim 17, which comprises moving the motor vehicle or the motor vehicle part to another location.

32. The method according to claim 31, which comprises:

receiving an identification information item, transmitted by a transponder, by way of the first antenna or a third antenna;

checking whether the component is correctly installed; and classifying the component as correctly installed only if at least one identification information item received by way of the first antenna or by way of the third antenna at a different location corresponds to the predefined identification information item.

33. The method according to claim 32, wherein the other location is a final check station or an intermediate check station.

34. A method of manufacturing a motor vehicle or a motor vehicle part, the method which comprises:

assembling the motor vehicle or the motor vehicle part from components, wherein at least two of the components are each associated with at least one transponder configured to transmit an identification information item;

transmitting an energy signal by way of a first antenna, wherein a transponder is supplied with energy through the energy signal or is excited to transmit an identification information item;

receiving an identification information item, transmitted by the transponder, by way of a second antenna; and checking whether a component can be installed or is correctly installed; and performing one of the steps of the group installing the component only if the identification information item received by way of the second antenna corresponds to a predefined identification information item; and classifying the component as correctly installed only if the identification information item received by way of the second antenna corresponds to a predefined identification information item.

35. The method according to claim 34, which comprises orienting the first antenna and the second antenna with respect to one another such that a main direction of the second antenna encloses an angle of 30° to 330° with respect to a main direction of the first antenna.

36. A method for manufacturing a motor vehicle or a motor vehicle part, the method comprising:

assembling the motor vehicle or the motor vehicle part from components, wherein at least two of the components are each associated with at least one transponder configured to transmit an identification information item;

receiving an identification information item, transmitted by a transponder, by way of an antenna;

determining a frequency of identical identification information items received by way of the antenna; and preforming one of the steps of the group of checking whether a component can be installed in dependence on the frequency of identical identification information items received by way of the antenna; and checking whether a component is correctly installed in dependence on the frequency of identical identification information items received by way of the antenna.

37. The method according to claim 36, which comprises installing the component or classifying the component as correctly installed only if a predefined identification information item corresponds to the identification information item received most frequently by way of the antenna.

38. The method according to claim 36, which comprises installing the component or classifying the component as correctly installed only if a predefined identification information item corresponds to an identification information item received at least a specific number of times by way of the antenna.

39. The method according to claim 36, which comprises installing the component or classifying the component as correctly installed only if a predefined identification information item corresponds to an identification information item received at least a specific number of times per unit of time by way of the antenna.

40. A method for manufacturing a motor vehicle or a motor vehicle part, the method comprising:
  assembling the motor vehicle or the motor vehicle part from components, wherein at least two of the components are each associated with at least one transponder configured to transmit an identification information item;
  receiving an identification information item, transmitted by a transponder, by way of an antenna at a first location;
  moving the motor vehicle or the motor vehicle part from the first location to a second location;
  receiving an identification information item, transmitted by a transponder, by way of the antenna or a further antenna at the second location; and
  checking whether a component can be installed or is correctly installed; and
  performing one of the steps of the group of
    installing the component only if the identification information item received at the first location corresponds both to the identification information item received at the second location and to a predefined identification information item; and
  classifying the component as correctly installed only if the identification information item received at the first location corresponds both to the identification information item received at the second location and to a predefined identification information item.

41. The method according to claim 40, wherein the first location is an assembly line or a part of the assembly line.

42. The method according to claim 40, wherein the second location is a final check station or an intermediate check station.

43. The method according to claim 42, wherein the first location is an assembly line or a part of the assembly line.

* * * * *